United States Patent [19]

Bolger et al.

[11] Patent Number: 5,079,139
[45] Date of Patent: * Jan. 7, 1992

[54] SILVER HALIDE PHOTOGRAPHIC MATERIAL

[75] Inventors: Walter Bolger, Harrow, United Kingdom; John D. Mee; Kenneth G. Harbison, both of Rochester, N.Y.; Hwei-Ling Yau, Rochester, N.Y.

[73] Assignee: Eastman Kodak Company, Rochester, N.Y.

[ * ] Notice: The portion of the term of this patent subsequent to Oct. 23, 2007 has been disclaimed.

[21] Appl. No.: 402,416

[22] Filed: Sep. 5, 1989

[30] Foreign Application Priority Data

Oct. 5, 1988 [GB] United Kingdom ................. 8823372

[51] Int. Cl.$^5$ ...................... G03C 1/12; G03C 1/16; G03C 1/22
[52] U.S. Cl. .................... 430/595; 430/510; 430/578; 430/592; 430/933
[58] Field of Search ............... 430/578, 510, 933, 592, 430/595

[56] References Cited

U.S. PATENT DOCUMENTS

| T887,029 | 6/1971 | Ulbing | 96/127 |
|---|---|---|---|
| 3,565,630 | 2/1971 | Millikan et al. | 96/120 |
| 3,822,135 | 7/1974 | Sakai et al. | 96/101 |
| 4,725,532 | 2/1988 | Kameoka et al. | 430/566 |
| 4,751,175 | 6/1988 | Aotsuka et al. | 430/560 |
| 4,770,961 | 9/1988 | Tanaka et al. | 430/578 |

FOREIGN PATENT DOCUMENTS 1004041 3/1957 Fed. Rep. of Germany.
262853 11/1987 Japan.
1471701 4/1977 United Kingdom.

OTHER PUBLICATIONS

Research Disclosure No. 12064, Apr. 1974, Kenneth Mason Publications, Dudley Annex, 21a North Street, Emsworth, Hampshire P010 7DQ, England.

Chemical Abstract 82382m-vol. 75, 1971, p. 398.

Primary Examiner—Charles L. Bowers, Jr.
Assistant Examiner—Mark R. Buscher
Attorney, Agent, or Firm—Andrew J. Anderson

[57] ABSTRACT

A photosensitive photographic material is described comprising a support bearing a silver halide emulsion layer sensitized with a dye of the general formula:

wherein
Y is S or Se,
$L^1$, $L^2$, $L^3$, $L^4$ and $L^5$ are each independently substituted or unsubstituted methine groups,
A is N—$R^3$ or O,
B is N—$R^4$ when A is O, or N—$R^4$, S, or O when A is N—$R^3$,
$R^1$ and $R^2$ are each a substituted or unsubstituted alkyl group,
$R^3$ and $R^4$ are each a substituted or unsubstituted alkyl or a substituted or unsubstituted aryl group,
$R^5$ is an alkyl group of 1–4 carbon atoms,
n is 0, 1 or 2, and
X is counterion,
and wherein at least two of $R^1$, $R^2$, $R^3$ and $R^4$ are substituted with an acid or acid salt substituent.

10 Claims, 3 Drawing Sheets

SILVER HALIDE PHOTOGRAPHIC MATERIAL

FIELD OF THE INVENTION

The present invention relates to silver halide photographic materials sensitive to helium neon laser and in particular to materials intended for exposure in graphic arts equipment.

BACKGROUND OF THE INVENTION

Photographic materials containing silver halide are sensitized to various regions of the spectrum through the use of sensitizing dyes. In many situations, such as with graphic arts materials, it is desirable to provide a red sensitive silver halide photographic material that can be exposed with, for example, a helium neon laser. It is also desirable that such a material be handleable under a safelight, e.g., a green safelight. Therefore, the sensitizing dye should impart sensitivity to silver halide in the red region of the spectrum, but not in the green region.

Classes of sensitising dyes have previously been proposed for preparing silver halide materials that are both sensitive to the red radiation produced by a Helium Neon laser and relatively non sensitive to safelight illumination. For example, British Patent Specification 1,471,701 describes the use of certain tri heterocyclic dyes for this purpose. A Problem with such dyes, however, is that they leave a residual stain in the processed material.

SUMMARY OF THE INVENTION

The present invention provides photographic materials sensitised to the radiation of a Helium-Neon laser (wavelength 632.8nm) and relatively insensitive to green safelight illumination by means of a class of tri heterocyclic dyes that are less stain forming than prior art dyes.

According to the present invention, there is provided a photosensitive photographic material comprising a support bearing a silver halide emulsion layer sensitised with a dye of the general formula:

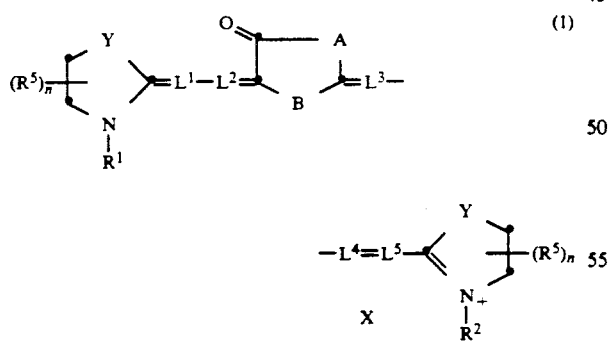

wherein
Y is S or Se,
$L^1$, $L^2$, $L^3$, $L^4$ and $L^5$ are each independently substituted or unsubstituted methine groups,
A is N—$R^3$ or O,
B is N—$R^4$ when A is O, or N—$R^4$, S, or O when A is N—$R^3$,
$R^1$ and $R^2$ are each a substituted or unsubstituted alkyl group, $R^3$ and $R^4$ are each a substituted or unsubstituted alkyl or a substituted or unsubstituted aryl group,
$R^5$ is an alkyl group of 1-4 carbon atoms,
n is 0, 1 or 2, and
X is a counterion,
and wherein at least two of $R^1$, $R^2$, $R^3$ and $R^4$ are substituted with an acid or acid salt substituent. The dyes employed in the present invention differ from those in the above prior art in a number of ways. For example, the terminal nuclei are free from aryl substituents or fused aryl rings and the methine chain on the right hand side of the central nucleus comprise three methine groups rather than only one.

The dyes of formula (1) above possess the unusual property of high water solubility combined with strong affinity for silver halide grains, giving rise to good photographic sensitivity and low or zero post process dye stain.

DESCRIPTION OF THE PREFERRED EMBODIMENTS

Figure 1:
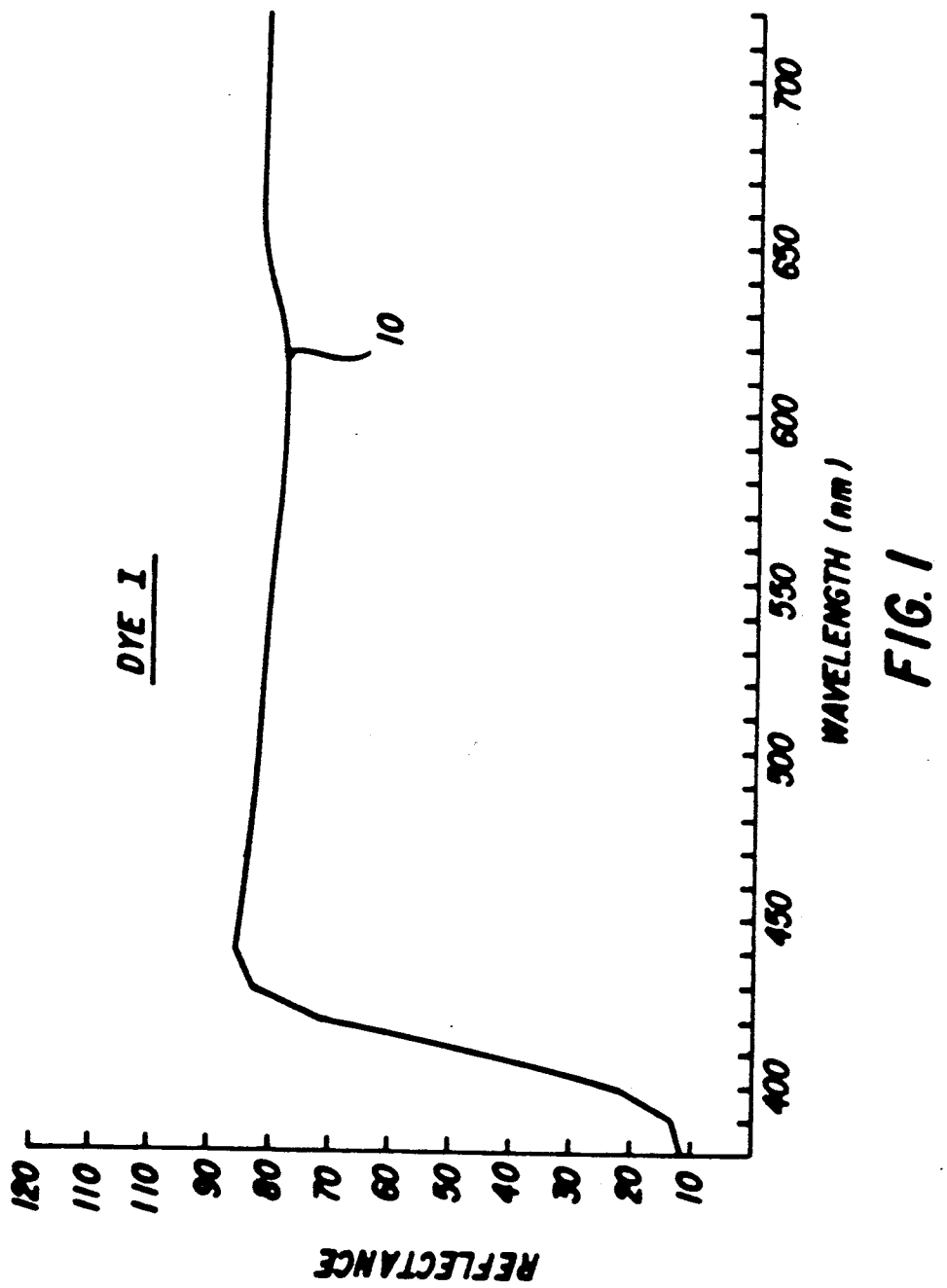
FIG. 1 represents a plot of spectral reflectance for Dye I used in accordance with the invention.

The preferred dyes are those of formula (1) above in which Y is S and n is 0. Acid and acid salt substituents for $R^1$-$R^4$ include sulpho, sulphato, carboxy, and the like, with sulpho being preferred. The Preferred groups $R^1$ and $R^2$ are sulphoalkyl groups in which the alkyl group contains 2-4 carbon atoms. Preferably the methine groups $L^1$ to $L^4$ are unsubstituted. The counterion X is preferably ammonium or an alkali metal, e.g. Na$^+$.

The substituents $R^5$, if present, may be for example methyl, ethyl, propyl or butyl.

Preferred dyes according to the present invention have the formula:

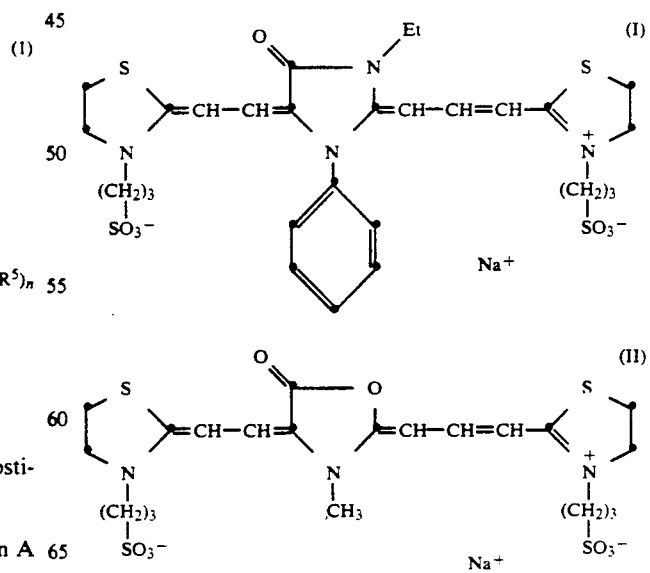

and

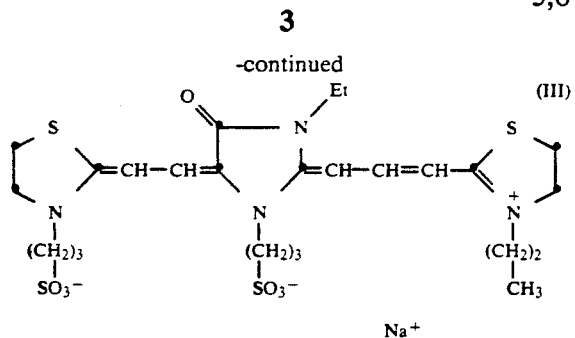

The support may be any photographic support, for example, transparent film or reflective paper support, e.g. Polyethylene coated paper.

For paper materials, it is customary to employ a fluorescent brightening agent. These may be incorporated into the materials by known techniques, for example, by dissolving a water soluble brightner in the gelatin supercoat (the layer most remote from the support). In a Preferred embodiment a water insoluble brightener may be used. Such brighteners are well known in the art and are described, for example, in U.S. Pat. No. 4,657,846, the disclosure of which is incorporated herein by reference. It may be imbibed onto particles of a polymer dispersion as described in British Patent Specification 1,504,949 or 1,504,950 or dissolved in droplets of coupler solvents prior to incorporation in a layer of the material, e.g. in the supercoat. In each case the residual dye stain is either absent or acceptable.

The present photographic materials may contain silver halide emulsions, additives, additional layers, etc, as described in Research Disclosure, December 1978, Item 17643, published by Industrial Opportunities Ltd, The Old Harbourmaster', 8 North Street, Elmsworth, Hants P010 7DD, UK.

While the present materials are relatively insensitive to green safelight, such sensitivity may be further reduced by incorporating a green light absorbing dye in the emulsion layer or an overlying layer, e.g. the supercoat layer.

The dye employed in the present invention may be Prepared by methods analogous to known methods. Alternatively the method described in U.S. application 253,835, filed Oct. 5, 1988, now U.S. Pat. No. 4,965,183 may be employed.

The following examples are given for a better understanding of the invention. Each of Examples 1-4 uses a chemically sensitised 70:30 chlorobromide cubic Rh-doped emulsion (0.28 μm) spectrally sensitized as described. The word "Kodak" is a trade mark.

SYNTHESIS EXAMPLE 1

Preparation of Dye (I)

1-Phenyl-2-methyl-2-imidazolin-4-one (1.76 g) and diethylsulfate (1.54 g) were mixed for 30 minutes at 100° C. A melt soon formed, which later became viscous and then semi solid. This substance was dissolved in 10 ml of $CH_3CN$ and added to a liquid formed by stirring a mixture of anhydro 2-(2-anilino-vinyl)-3-(3-sulfopropyl) thiazoline (6.54g), $CH_3CN$ (60ml), acetic anhydride (4g), and triethylamine (6g) for 15 minutes at room temperature. 2 ml of additional triethylamine was added to this liquid, which was then heated to a boil while stirring. The liquid was allowed to stand for 5 minutes without heating. The resulting oily residue was stirred with 100ml ethyl ether, decanted, dissolved in 100 methanol, filtered, and solution was seeded to start crystallization. The mixture was then heated to a boil and stirred for 4 hours wile the mixture cooled. The solid (Dye (I)) was collected and washed with methanol, and then ethyl ether. λ-max $(CH_3OH)=607$ nm, ε-max $-12.2 \times 10^4$.

SYNTHESIS EXAMPLE 2

Preparation of Dye (II)

Anyhdro-2-(2-anilinovinyl)-3-(3-sulfopropyl) thiazolinium hydroxide (6.53g), sarcosine (1.0g), and acetic anydride (40 ml) were mixed in a flask, which was then placed in an oil bath preheated to 100° C. and triethylamine (5.05 g) was added immediately. The mixture was stirred and heated for 5 minutes, cooled to room temperature, and diluted to 250 ml with $CH_3CN$. The mixture was chilled and the precipitate collected, washed with $CH_3CN$, then ethyl ether, and dried. This solid was dissolved in 175 ml boiling methanol containing about 1% acetic acid and filtered hot. To the hot solution was added 1 g sodium acetate dissolved in 15 ml water. The mixture was then cooled while stirring for about 1 hour. The solid was collected washed with methanol containing about 1% acetic acid, then ethyl ether, and dried to yield 2.51 g of Dye 1. λ-max-582 mn $(H_2O)$, β-max$=14.81 \times 10^4$. NMR and combustion analyses were consistent w the assigned structure.

EXAMPLE 1

The emulsion was spectrally sensitized with 100mg spectral sensitizer II/mole AgX and coated at 4.0 g Ag/m² together with a gelatin overcoat on subbed polyester film. The coating was exposed on a simple wedge spectrometer and processed in a rapid access processor under the following conditions:

| Developer | Kodak Rapid Scanner Developer (1:4) | 30S @ 38° C. |
|---|---|---|
| Fixer | Kodak Rapid Fix + Hardener | 30S @ 38° C. |
| Wash | Running Tap Water | 30S |
| Dry | Hot Air | |

The resulting image showed that the film had peak photographic sensitivity at 630-640nm and low sensitivity at 450-500nm. The transmission spectrum of the non image area of the processed film showed no dye retention.

EXAMPLE 2

The emulsion was spectrally sensitized with 50 mg spectral sensitizer II/mole AgX and coated at 1.38 g Ag/m² together with a gelatin supercoat including a water soluble fluorescent whitener having the structure

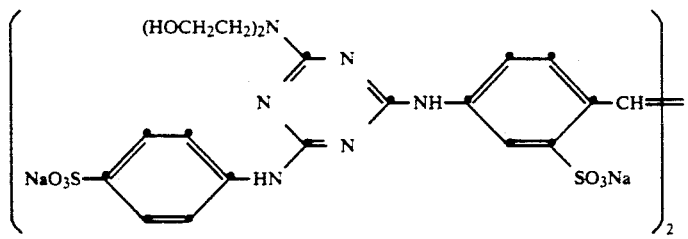

(66 mg/m²) on resin coated paper support. The coating was exposed as in Example 1 and processed in a rapid access processor under the following conditions:

| Developer | Kodak Liquid Phototypesetting Developer | 33S @ 32° C. |
|---|---|---|
| Fix | Kodak Rapid Fix + Hardener | 33S @ 32° C. |
| Wash | Running Tap Water | 33S |
| Dryer | Hot Air | |

The paper had peak photographic sensitivity at 630–640nm and low sensitivity at 450–500nm. The reflection spectrum of the non image area of the processed paper (Pacific Spectrogard) shows only a small amount of retained dye and the processed paper has a pleasing background appearance.

EXAMPLE 3

The emulsion was spectrally sensitized with 50mg spectral sensitizer II/mole AgX and additionally doctored with a latex polymer containing imbibed a water insoluble fluorescent whitener having the structure

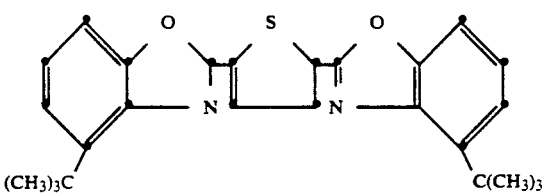

(laydown=30 mg/m ) together with a gelatin overcoat on resin coated paper support.

The photographic spectral sensitivity of the coating was similar to that obtained for Example 2. The reflection spectrum of the processed paper showed that in this case no spectral sensitizer was retained and the coating had a pleasing background appearance.

EXAMPLE 4

Coatings were made and tested as described in Example 2 at three different levels (40, 80 and 120 mg/mole AgX) of sensitising dye I and dye (B) representing the prior art having the formula:

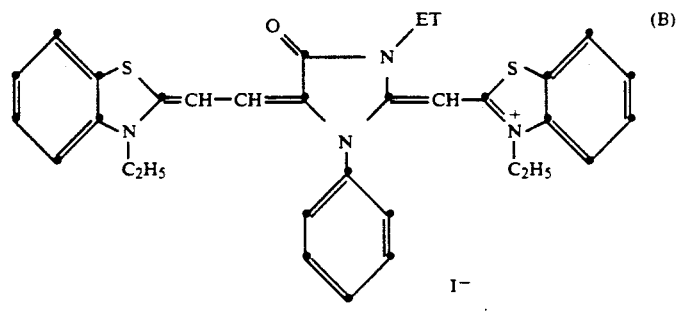

which is Dye 37 of British Specification 1,471,701.

Figure 2:
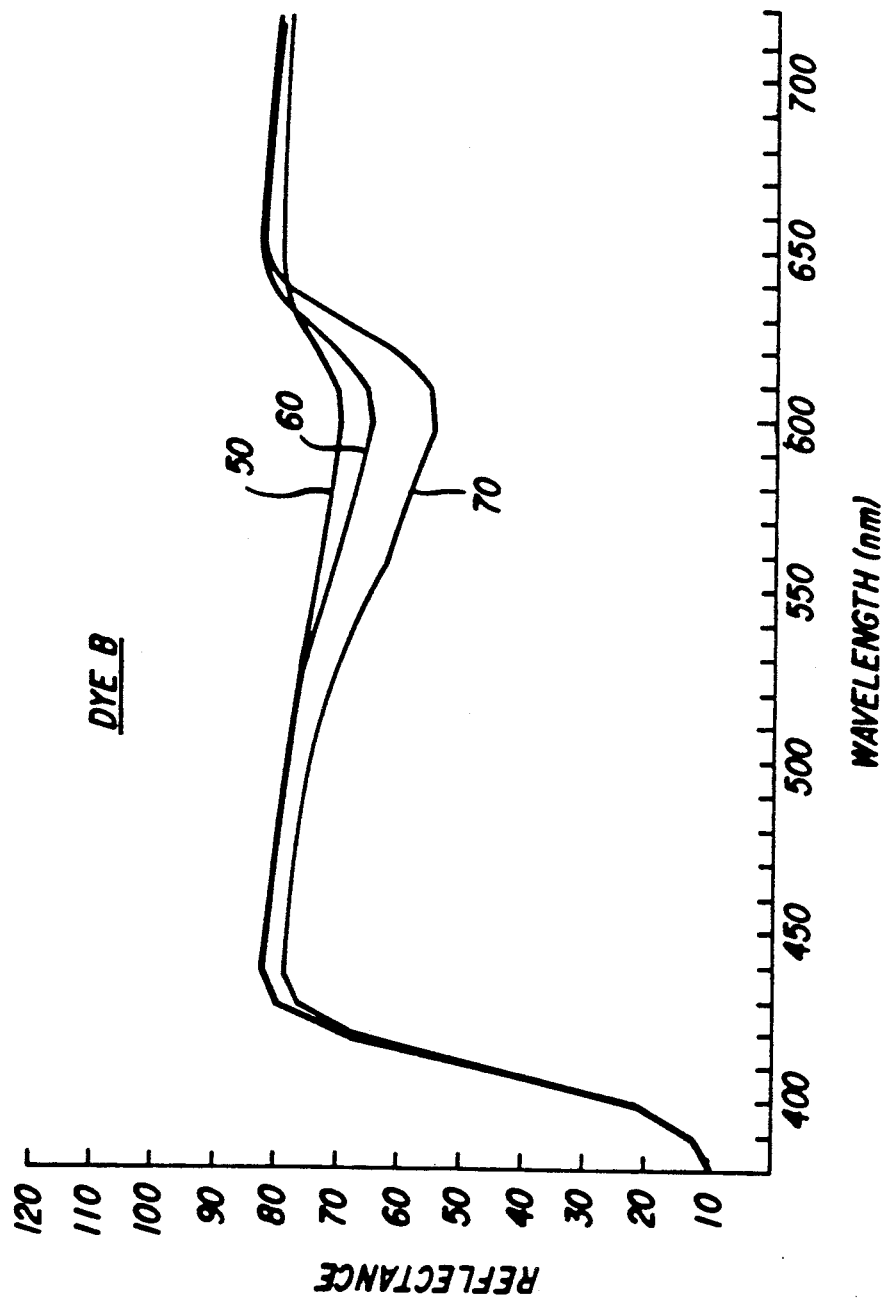
FIG. 2 represents a plot of spectral reflectance for comparison Dye B. The plots are used in Example 4 below to demonstrate lower propensity for dye stain of Dye I compared to the comparison dyes.
Figure 3:
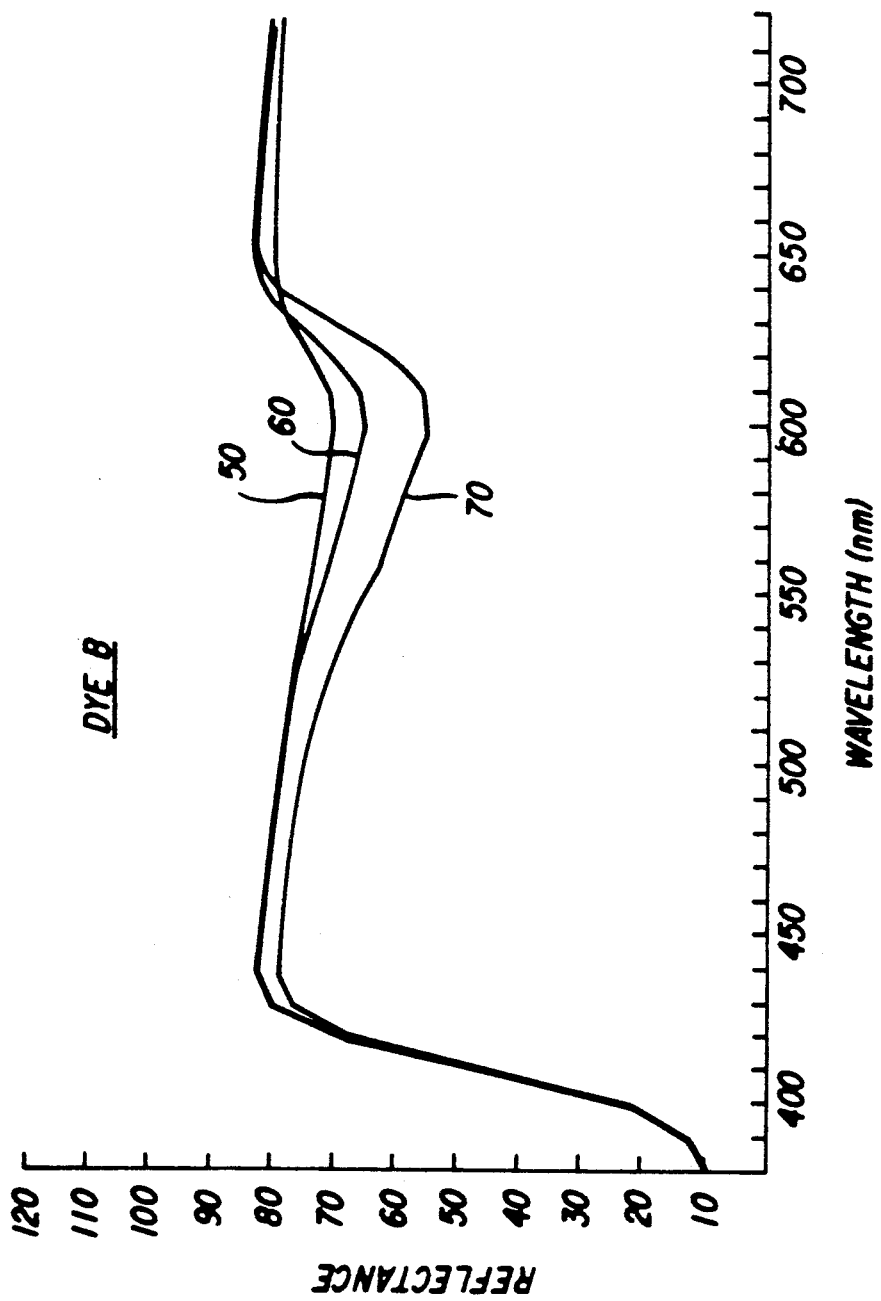

The paper containing Dye (I) had peak photographic sensitivity at 630–640 nm and low sensitivity at 450–500 nm. Spectral reflectance curves indicating spectral absorption that cause staining are shown in FIGS. 1 and 2. In these plots, the reflectance curve most nearly a straight horizontal line in the visible region of the spectrum will indicate the least stain. In FIG. 1, curve 10 represents a plot of spectral reflectance at 40, 80, and 120 mg/mole AgX of Dye I. In FIG. 2, curve 50 represents a plot of spectral reflectance at 40 mg/mole AgX of Dye B, curve 60 represents the same plot for 80 mg/mole AgX of Dye B, and curve 70 represents the same plot for 120 mg/mole AgX of Dye B. From these figures, it can be seen that increasing levels of dye (B) will cause progressively more stain, whereas increasing the concentration of the dyes of formula 1 does not result in any increase in stain.

The invention has been described in detail with particular reference to preferred embodiments thereof, but it will be understood that variations and modifications can be effected within the spirit and scope of the invention.

We claim:

1. A photographic material comprising a support bearing a silver halide emulsion layer sensitized with a dye of the formula:

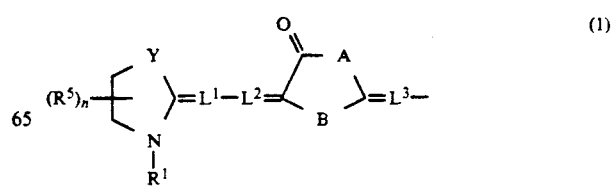

-continued $$-L^4=L^5-\underset{X}{\overset{Y}{\underset{\underset{R^2}{|}}{\overset{}{\bigg\langle}}}}(R^5)_n$$

wherein

Y is S or Se, $L^1$, $L^2$, $L^3$, $L^4$ and $L^5$ are each independently substituted or unsubstituted methine groups, A is $N-R^3$ or O, B is $N-R^4$ when A is O, or $N-R^4$, S, or O when A is $N-R^3$, $R^1$ and $R^2$ are each a substituted or unsubstituted alkyl or a substituted or unsubstituted aryl group, $R^5$ is an alkyl group of 1–4 carbon atoms, n is 0, 1, or 2, and X is a counterion, and wherein at least two of $R^1$, $R^2$, $R^3$ and $R^4$ are substituted with an acid or acid salt substituent.

2. A photographic material as claimed in claim 1 wherein n is 0.

3. A photographic material as claimed in claim 1 wherein at least two of $R^1$, $R^2$, $R^3$, and $R^4$ are a sulphoalkyl, sulphatoalkyl or carboxyalkyl group.

4. A photographic material as claimed in claim 1 wherein $R^1$ and $R^2$ are sulphoalkyl groups containing 2–4 carbon atoms.

5. A photographic material as claimed in claim 1 wherein $L^1$, $L^2$, $L^3$, and $L^4$ are all unsubstituted methine groups.

6. A photographic material as claimed in claim 1 wherein the dye is selected from the group consisting of:

7. A photographic material as claimed in any of claims 1–6, further comprising a fluorescent brightening agent in a layer thereof.

8. A photographic material as claimed in claim 7 wherein the brightening agent is in the layer most distant from the support.

9. A photographic material as claimed in claim 8 wherein the brightening agent is water insoluble.

10. A photographic material as claimed in claim 9 in which the fluorescent brightening agent is imbibed on particles of a polymer latex or dissolved in droplets of a coupler solvent.

* * * * *

UNITED STATES PATENT AND TRADEMARK OFFICE
CERTIFICATE OF CORRECTION

PATENT NO. : 5,079,139

DATED : January 7, 1992

INVENTOR(S) : Walter Bolger, John D. Mee, Kenneth G. Harbison and Hwe-Ling Yau It is certified that error appears in the above-identified patent and that said Letters Patent is hereby corrected as shown below:

Column 7, line 20, after "alkyl" insert -- group, $R^3$ and $R^4$ are each a substituted or unsubstituted alkyl --.

Signed and Sealed this

First Day of June, 1993

Attest:

MICHAEL K. KIRK

*Attesting Officer*     Acting Commissioner of Patents and Trademarks